US009637566B2

(12) United States Patent
Kwon et al.

(10) Patent No.: US 9,637,566 B2
(45) Date of Patent: May 2, 2017

(54) METHOD FOR PREPARING SUPPORTED METALLOCENE CATALYST AND METHOD FOR PREPARING POLYOLEFIN USING THE SAME

(71) Applicant: LG CHEM, LTD., Seoul (KR)

(72) Inventors: Hyuck-Ju Kwon, Yeosu-si (KR); San-Ak Hwang, Yeosu-si (KR); Dong-Gil Lee, Daejeon (KR); Churl-Young Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/222,127

(22) Filed: Mar. 21, 2014

(65) Prior Publication Data
US 2014/0206828 A1    Jul. 24, 2014

Related U.S. Application Data

(63) Continuation of application No. 13/583,553, filed as application No. PCT/KR2011/001590 on Mar. 8, 2011.

(30) Foreign Application Priority Data

Mar. 8, 2010    (KR) .................. 10-2010-0020351
Mar. 8, 2010    (KR) .................. 10-2010-0020352
Mar. 24, 2010   (KR) .................. 10-2010-0026075

(51) Int. Cl.
*C08F 4/653*     (2006.01)
*C08F 4/6592*    (2006.01)
*C08F 4/642*     (2006.01)
*C08F 10/00*     (2006.01)
*C08F 4/659*     (2006.01)
*C08F 110/02*    (2006.01)

(52) U.S. Cl.
CPC ...... *C08F 4/65922* (2013.01); *C08F 4/65904* (2013.01); *C08F 4/65916* (2013.01); *C08F 4/65927* (2013.01); *C08F 10/00* (2013.01); *C08F 110/02* (2013.01); *C08F 4/65908* (2013.01); *C08F 4/65912* (2013.01); *C08F 4/65925* (2013.01)

(58) Field of Classification Search
CPC .............. C08F 4/65904; C08F 4/65908; C08F 4/65912; C08F 4/65916; C08F 4/6592; C08F 4/65925; C08F 4/65927
See application file for complete search history.

(56) References Cited

U.S. PATENT DOCUMENTS

| 5,324,800 | A | 6/1994 | Welborn, Jr. et al. |
| 6,207,606 | B1 | 3/2001 | Lue et al. |
| 6,908,972 | B2 * | 6/2005 | Tsuie et al. ................ 526/160 |
| 7,294,600 | B2 | 11/2007 | Lee et al. |
| 7,429,635 | B2 * | 9/2008 | Wang ........................ 526/119 |
| 2003/0203809 | A1 * | 10/2003 | Kao ................... C08F 210/16 502/150 |
| 2006/0116490 | A1 | 6/2006 | Paczkowski et al. |

FOREIGN PATENT DOCUMENTS

| CN | 1697843 | | 11/2005 |
| CN | 1910207 | A | 2/2007 |
| JP | 06-056928 | | 3/1994 |
| JP | 1995-196722 | | 8/1995 |
| JP | 07196722 | | 8/1995 |
| JP | 2006-509904 | | 3/2006 |
| JP | 2007-519781 | | 7/2007 |
| JP | 2008-121027 | | 5/2008 |
| JP | 2008-530298 | | 8/2008 |
| KR | 10-2001-0081727 | A | 8/2001 |
| KR | 10-2004-0085650 | A | 10/2004 |
| KR | 10-2006-0087890 | A | 8/2006 |
| KR | 10-2009-0063799 | A | 6/2009 |
| WO | 0240549 | A2 | 5/2002 |
| WO | 2004-087770 | | 10/2004 |
| WO | 2006-025709 | | 3/2006 |
| WO | 2008-042059 | | 4/2008 |
| WO | 2008/042059 | A1 | 4/2008 |

OTHER PUBLICATIONS

Marques, M.D.F.V. et al., Binary Matallocene Supported Catalyst for Propylene Polymerization. In: Eur. Poly. J., 2003, vol. 39, pp. 561-567.

* cited by examiner

*Primary Examiner* — Caixia Lu
(74) *Attorney, Agent, or Firm* — Lerner, David, Littenberg, Krumholz & Mentlik, LLP

(57) ABSTRACT

The present invention relates to a method for preparing a supported metallocene catalyst, and a method for preparing polyolefin using the same, in which the supported metallocene catalyst prepared from the simple process according to the method for preparing the supported metallocene catalyst of the present invention can apply to the polymerization of the polyolefin that is polymerized at low pressure or high pressure; the molecular weight distribution of polyolefin prepared can be easily controlled; and there are effects such that its catalyst activity is significantly higher than that of the existed supported metallocene catalyst, and the molecular weight distribution can be easily controlled.

9 Claims, No Drawings

METHOD FOR PREPARING SUPPORTED METALLOCENE CATALYST AND METHOD FOR PREPARING POLYOLEFIN USING THE SAME

This application is a Continuation of U.S. application Ser. No. 13/583,553, filed Sep. 7, 2012, which is a National Stage Entry of International Application No. PCT/KR2011/001590, filed Mar. 8, 2011, and claims the benefit of Korean Application No. 10-2010-0026075, filed on Mar. 24, 2010, Korean Application No. 10-2010-0020351, filed on Mar. 8, 2010 and Korean Application No. 10-2010-0020352, filed on Mar. 8, 2010, all of which are hereby incorporated herein by reference in their entirety for all purposes as if fully set forth herein.

TECHNICAL FIELD

The present invention relates to a method for preparing supported metallocene catalyst, and more specifically, to a method for preparing high-activity supported metallocene catalyst and a method for preparing polyolefin using the same.

BACKGROUND ART

In 1976, Professor, Kaminsky reported that the polymerization of olefin can use zirconocene dichloride compound as catalyst and methyl aluminoxane (MAO) compound obtained by a partial hydrolysis of trimethyl aluminium as co-catalyst (A. Anderson, J. G. Corde, J. Herwig, W. Kaminsky, A. Merck, R. Mottweiler, J. Pein, H. Sinn, and H. J. Vollmer, Angew. Chem. Int. Ed. Engl., 15, 630, 1976).

Since then, Exon filed the patent (U.S. Pat. No. 5,324,800) about the polymerization of olefin using a metallocene compound having various substituents at cyclopentadienyl ligand.

Since the above metallocene catalyst has uniform active sites, there are the advantages such that the molecular weight distribution of polymer is narrow, the co-polymerization is easy, the distribution of second monomer is uniform, and also the polymer stereostructure can be controlled according to the symmetry of catalyst in the case of the polymerization of propylene. Specifically, the existed Ziegler-Natta catalyst can produce only isotactic polypropylene, but in the case of using metallocene catalyst, various polypropylene, such as isotactic, syndiotactic, atactic, and also hemiisotactic polypropylene, and the like, can be stereo-regularly produced. For example, in the case of syndiotactic polypropylene synthesized by using metallocene, there are characteristics such that it has a low crystallinity, the suitable stiffness and hardness, a good transparency, and also a high impact resistance. That is, the active researches are currently underway regarding the metallocene catalyst because there are advantages such that the stereo-structure can be controlled by using the metallocene catalyst on preparing polyolefin, and also the properties of polymer can be easily controlled. However, there is a problem such that for the polymerization technique of olefin using the above homogenous catalyst, the shape of polymer is difficulty maintained in the case of a gas-phase process or a slurry process, and also a large quantity of MAO is required for expressing a maximum activity of metallocene catalyst. The metallocene catalyst should be used after supporting in a suitable support in order to solve the above problem. In addition, there are advantages such that in the case of supporting the catalyst as mentioned above, the weight distribution can be controlled according to the usage, the apparent density of the polymer produced can be improved, and also the fouling phenomenon in the reactor can be decreased, as well as the shape of the polymer produced can be controlled.

A method for preparing supported metallocene catalyst by contacting with aluminoxane after firstly combining physicochemically a metallocene compound with a support; a method for preparing supported metallocene catalyst by reacting with the metallocene compound after supporting aluminoxane in a support; a method for preparing supported metallocene catalyst by supporting in a support after firstly contacting aluminoxane with the metallocene compound; and the like are generally known as a method for preparing supported metallocene catalyst. The catalyst structure having single active site should be maintained after supporting so that the supported catalyst has the same high-activity and co-polymerization efficiency with the homogeneous catalyst. In addition, the catalyst should not be removed from the support on polymerizing in order to prevent a fouling in a reactor. In addition, the fineness, the fineness distribution and the apparent density of the polymer are depended on a particle shape and a mechanical property of the supported catalyst. Korean Registration Publication No. 10-0404780 discloses a metallocene compound having silacycloalkyl substituent, and a supported catalyst using the same, but in the case of using the above metallocene compound in a gas-phase process or a slurry process, since the catalyst is isolated from a support, a fouling may be occurred in a reactor.

Meanwhile, Japan Registration Publication 1994-56928 discloses a method for preparing supported metallocene catalyst by combining metal at the ligand after firstly supporting ligand on a surface of support by a chemical bond. However, there is a disadvantage such that the process for preparing catalyst is very complicated, and a lot of catalysts should be supported on the support.

It is the oldest method for preparing non-homogeneous catalyst having a single active site; comprising reacting with the metallocene compound after supporting aluminoxane at the support among the above various methods for preparing supported catalyst. For example, the supported catalyst is prepared by reacting silica with aluminoxane solution; filtering filtrate out; and then reacting with zirconocene dissolved in toluene or aliphatic hydrocarbon solution, and the supported catalyst can be used in polymerization or co-polymerization in a gas-phase process or a slurry process. The method for supporting has a relative high activity because co-catalyst is physicochemically fixed on the surface of support and the catalyst is existed as a type of the combination with the co-catalyst by an ionic bond. In addition, the method for supporting can be easily applied in an existed slurry process or gas-phase process because the single-phase catalyst can be prepared, in which it is not required to further use aluminoxane in a polymerization reactor. However, there were disadvantages such that the fouling in a reactor may be occurred because the isolation of catalyst cannot be completely prevented, and there is a limit to aluminoxane that can be combined to silica so that there is a limit to the metallocene compound that can be combined by that.

International Patent Publication No. WO2002/040549 discloses olefin polymerization catalyst including a support, an ionization active agent, such as dimethylanilinium tetra(pentafluorophenyl)borate, triphenylcarbeniumtetra(pentafluorophenyl)borate, and the like, and an supported active agent, such as a metallocene compound, MAO, and the like; Japan Publication Patent No. 2008-121027 discloses the catalyst for preparing olefin polymer, including a support, such as silica, a transition metal compound, such as methylaluminoxane, bis(indenyl)zirconiumdichloride, and the like, and [PhNMe$_2$H] [B(C$_6$F$_5$)$_4$]; US Publication Patent No. 2006/0116490 discloses metallocene catalyst for polymerizing olefin, including a metallocene compound and co-catalyst that is combined of an ionic compound, such as aluminoxane, tetrakis(pentafluorophenyl) borate, and the like, and a support; and Akihiro Yano discloses an ethylene polymerization catalyst including a metallocene compound and dimethylanilinium tetrakis(pentafluorophenyl)borate (Me$_2$PhNH.B(C$_6$F$_5$)$_4$/triisobutylaluminum (i-Bu$_3$Al) in Journal of Molecular Catalysis A; Chemical 156_2000.133-141. However, there are disadvantages such that the above catalysts have a low activity and the molecular weight distribution cannot be easily controlled.

DISCLOSURE

Technical Problem

In order to solve the above problems, the present invention is to provide a method for manufacturing high-activity supported metallocene catalyst that can be manufactured in a simple process and has a significantly high catalyst activity as compared with the existed supported metallocene catalyst. In addition, the present invention is to provide a method for manufacturing polyolefin, in which the supported metallocene catalyst prepared according to the method for manufacturing a high-activity supported metallocene catalyst according to the present invention can be applied in a polymerization process of polyolefin that is polymerized at low pressure or high pressure, the molecular weight distribution of polyolefin can be easily controlled, and the fouling can be prevented on manufacturing process.

Technical Solution

In order to achieve the first technical object, the present invention is to provide a method for manufacturing supported metallocene catalyst, in which the metallocene compound is one or more selected from the group consisting of the compounds represented by the following Formula 1 to Formula 3, and the method includes i) preparing a support supported with a metallocene compound 1 by reacting one or more metallocene compounds, selected from the group consisting of the compounds represented by Formula 1 to Formula 3, with a support, ii) preparing a support supported with the metallocene compound 1 and a co-catalyst 1 by reacting the support supported with the metallocene compound 1 with the co-catalyst 1; iii) preparing a catalyst precursor by reacting a metallocene compound 2 and the support supported with the metallocene compound 1 and the co-catalyst 1; and iv) preparing the supported metallocene catalyst by reacting the catalyst precursor and a co-catalyst 2, where the metallocene compounds 1 and 2 are one or more selected from the group consisting of the compounds represented by Formula 1 to Formula 3, respectively.

$(C_pR^1{}_aR^m{}_b)(C_{p'}R^2{}_{a'}R^n{}_{b'})_zMQ_k$ [Formula 1]

[Formula 2]

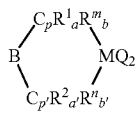

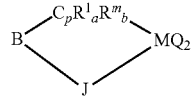

[Formula 3]

[In the above Formula 1, 2 or 3,

Cp and Cp' are the same or different one selected from the group consisting of cyclopentadienyl, indenyl, 4,5,6,7-tetrahydro-1-indenyl and fluororenyl radical to each other; R$^m$ and R$^n$ are the same or different hydrogen radical, alkyl radical of carbon number 1~20, cycloalkyl radical of carbon number 3~23, aryl radical of carbon number 6~26, alkenyl radical of carbon number 2~22, alkylaryl radical of of carbon number 7~27, arylalkyl radical of carbon number 7~27, arylalkenyl radical of carbon number 8~28 or alkylsilyl radical of carbon number 1~20; R$^1$ and R$^2$ are the same or different hydrogen radical or hydrocarbyl radical of carbon number 1~6; a, a', b and b' are an integer of 1~4, respectively;

M is a transition metal in group IVB, group VB or group VIB of the periodic table;

Q is a halogen radical, or alkyl radical of carbon number 1~20, alkenyl radical of carbon number 2~22, aryl radical of carbon number 6~26, alkylaryl radical of carbon number 7~27, arylalkyl radical of carbon number 7~27; or alkylidene radical of carbon number 1~20, k is 2 or 3, z is 0 or 1, and when k is 3, z is 0;

B is one selected from the group consisting of alkyl radical of carbon number 1~4, or hydrocarbyl radical including silicon, germanium, phosphorus, nitrogen, boron or aluminum;

In the Formula 3, J is one selected from the group consisting of NR$^s$, O, PR$^s$ and S, the Rs is alkyl radical of carbon number 1~20 or substituted alkyl radical;

When at least one of the R$^m$, R$^n$ and R$^s$ is hydrogen, any one of the hydrogen is substituted with Formula 4, 5 or 6:

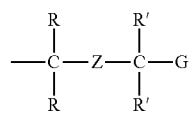

[Formula 4]

[In the above Formula 4,

Z is oxygen atom or sulfur atom, and preferably oxygen atom;

R and R' are the same or different hydrogen radical; alkyl radical of carbon number 1~20, cycloalkyl radical of carbon number 3~23, aryl radical of carbon number 6~26, alkenyl radical of carbon number 2~22, alkylaryl radical of of carbon number 7~27, arylalkyl radical of carbon number 7~27, or arylalkenyl radical of carbon number 8~28, or preferably the same or different alkyl radical of carbon number 1~20; two of R' may be connected to each other to form a ring;

G is alkoxy radical of carbon number 1~20, aryloxy of carbon number 6~26, alkylthio of carbon number 1~20, arylthio of carbon number 6~26, phenyl or substituted phenyl of carbon number 1~20, or preferably alkoxyl of carbon number 1~20, and may be connected to R' to form a ring;

When Z is sulfur atom, G should be alkoxy or aryloxy;
When G is alkylthio, arylthio, phenyl or substituted phenyl, Z should be oxygen atom]

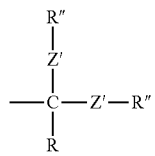
[Formula 5]

[In the above Formula 5,

Z' is oxygen atom or sulfur atom, or preferably oxygen atom, at least one of two Z' is oxygen atom;

R and R" are the same or different hydrogen radical; alkyl radical of carbon number 1~20, cycloalkyl radical of carbon number 3~23, aryl radical of carbon number 6~26, alkenyl radical of carbon number 2~22, alkylaryl radical of of carbon number 7~27, arylalkyl radical of carbon number 7~27, or arylalkenyl radical of carbon number 8~28, or preferably the same or different alkyl radical of carbon number 1~20;

R and R", or two R"s may be connected to each other to form a ring]

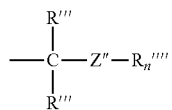
[Formula 6]

[In the above Formula 6,

Z" is oxygen, sulfur, nitrogen, phosphorus or arsenic atom, or preferably oxygen atom;

R''' is the same or different hydrogen radical, alkyl radical of carbon number 1~40, cycloalkyl radical of carbon number 3~43, aryl radical of carbon number 6~46, alkenyl radical of carbon number 2~42, alkylaryl radical of carbon number 7~47, arylalkyl radical of carbon number 7~47 or arylalkenyl radical of carbon number 8~48 to each other, preferably the same or different alkyl radical of carbon number 1~40 to each other;

R"" is hydrogen radical, alkyl radical of carbon number 1~40, aryl radical of carbon number 6~46, alkenyl radical of carbon number 2~42, alkyaryl radical of carbon number 7~47, alkylsilyl radical of carbon number 1~40, arylsilyl radical of carbon number 6~46, phenyl or substituted phenyl of carbon number 6~46 to each other, preferably alkyl radical of carbon number 1~40;

n is 1 or 2, or preferably 1, when Z" is oxygen or sulfur, n is 1; when Z" is nitrogen, phosphorus or arsenic, n is 2]

In order to achieve the second technique object, the present invention is to provide a method for manufacturing polyolefin, in which the olefin-based monomers are polymerized under the presence of the supported metallocene catalyst prepared according to the present invention.

Hereinafter, the present invention will be described in detail.

The method for manufacturing the supported metallocene catalyst for the polymerization of the polyolefin according to the present invention is composed of including: i) preparing the support supported with co-catalyst by reacting the support with a co-catalyst 1; ii) preparing the catalyst precursor that is gradually supported with the co-catalyst and the metallocene compound in the support by reacting the support supported with the co-catalyst with the metallocene compound; and iii) preparing the metallocene catalyst by reacting the catalyst precursor and a co-catalyst 2.

At this time, the above step ii) may be composed of preparing the support that is supported with the metallocene compounds 1 and 2, and the co-catalyst 1 by reacting the metallocene compound 2 represented by Formula 2 or Formula 3 and the metallocene compound 1 represented by Formula 1 with the support supported with the co-catalyst 1.

In addition, before the above step i), the step for preparing the support supported with the metallocene compound 1' by reacting one or more metallocene compound selected from the group consisting of the compounds represented by Formulas 1 to 3 with the support may be further added.

Specifically, the present invention is characteristic of comprising: (step a1) reacting the co-catalyst 1 that is an organic metal compound including aluminum with the support; (step b1) preparing the support supported with the co-catalyst 1 and the metallocene compound by reacting the supported co-catalyst with the metallocene compound that is substituted with the functional group, such as alkoxy that can be acted in a role of Lewis base as a oxygen-donor (O-donor) at cyclopentadiene, cyclopentadiene derivatives, or bridge group; and (step c1) preparing the supported metallocene catalyst supported with the metallocene compound, and the co-catalysts 1 and 2 by reacting the co-catalyst 2 that is an organic metal compound including boron therein; in which the present invention can be possible to provide the supported metallocene catalyst having an excellent the polymerization activity that not generates the fouling in a reactor while not isolating the supported catalyst on polymerizing olefin.

The reaction (a1) of the support and the co-catalyst 1 may be performed with or without solvent. The available solvent includes aliphatic hydrocarbon solvent, such as hexane and pentane, and aromatic hydrocarbon solvent, such as toluene.

The reaction temperature in the above step (a1) may be −20° C. to 100° C. because the reaction solvent can be existed in a liquid state within the above temperature range, and preferable −10° C. to 100° C., more preferably 0° C. to 80° C. because the reaction can be optimally performed within the above temperature range. Meanwhile, the reaction time may be 10 minutes to 24 hours.

The catalyst supported the co-catalyst obtained from the above process can be used as it is after removing the reaction solvent through a filtration or a distillation under the reduced pressure, and if necessary, can be used after soxhlet filtering with aromatic hydrocarbon, such as toluene.

The available solvent for the reaction (b1) of the metallocene catalyst and the support supported with the co-catalyst 1 mostly is an organic solvent, such as aliphatic hydrocarbon solvent, for example hexane and pentane, aromatic hydrocarbon solvent, for example toluene and benzene, the hydrocarbon solvent substituted with chorine atom, such as dichloromethane, ether-based solvent, for example diethylether and THF, acetone, and ethylacetate, and preferably hexane, heptane, and toluene.

In the above step (b1), the reaction temperature may be 0° C. to 100° C. and the reaction time may be preferably 5 minutes to 24 hours.

The available solvent in the step (c1) for preparing the supported metallocene catalyst by reacting the co-catalyst 2 and the support supported with the co-catalyst 1 and the metallocene compound is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (c1), the reaction temperature may be 0° C. to 100° C. and the reaction time may be preferably 5 minutes to 24 hours.

In addition, the present invention is characteristic of comprising: (step a2) reacting the co-catalyst 1 that is an organic metal compound including aluminum with the support; (step b2) preparing the support supported with the co-catalyst 1, and the metallocene compounds 1 and 2 by reacting the supported co-catalyst with the different two or more metallocene compounds to each other that is substituted with the functional group, such as alkoxy that can be acted in a role of Lewis base as the oxygen-donor (O-donor) at cyclopentadiene, cyclopentadiene derivatives or bridge group; and (step c2) preparing the hybrid supported metallocene catalyst supported the co-catalysts 1 and 2, and the metallocene compounds 1 and 2 by reacting the co-catalyst 2 that is an organic metal compound including boron therein; in which the supported catalyst is not isolated when polymerizing olefin so that the fouling in a reactor is not generated, and also the present invention can provide the hybrid supported metallocene catalyst having an excellent polymerization activity.

The reaction of the support and the co-catalyst 1 (step a2) may be performed with or without solvent. The available solvent includes aliphatic hydrocarbon solvent, such as hexane and pentane, and aromatic hydrocarbon solvent, such as toluene. In the above step (a2), the reaction temperature may be −20° C. to 100° C. because the reaction solvent can be existed in a liquid state within the above temperature range, and preferably −10° C. to 100° C., and more preferably 0° C. to 80° C., because the reaction can be optimally performed within the above temperature range. Meanwhile, the reaction time may be 10 minutes to 24 hours.

The catalyst supported with the co-catalyst obtained from the above process may be used as it is by removing the reaction solvent through the filtration or the distillation under the reduced pressure, and if necessary, it may be used by soxhlet filtering with aromatic hydrocarbon, such as toluene.

The available solvent in the reaction of the meallocene catalyst and the support supported with the co-catalyst 1 (b2) is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (b2), the reaction temperature may be 0° C. to 100° C. and the reaction time may be preferably 5 minutes to 24 hours.

The available solvent in the step (c2) for preparing the hybrid supported metallocene catalyst by reacting the co-catalyst 2 with the support supported with the co-catalyst 1, and metallocene compounds 1 and 2 is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (c2), the reaction temperature may be 0° C. to 100° C. and the reaction time may be preferably 5 minutes to 24 hours.

In addition, the present invention is characteristic of comprising: (step a3) preparing the support supported with the metallocene compound 1 by reacting one or more metallocene compound 1 selected from the compounds represented by the above Formula 1 to Formula 3 that is substituted with the functional group, such as alkoxy that can be acted in a role of Lewis base as the oxygen-donor (O-donor) at cyclopentadiene, cyclopentadiene derivatives or bridge group with the support; (step b3) preparing the support supported with the co-catalyst 1 and the metallocene compound 1 by reacting the co-catalyst 1 that is an organic metal compound including aluminum with the support supported with the metallocene compound 1; (step c3) preparing the support supported with the metallocene compound 1, the co-catalyst 1, and the metallocene compound 2 by reacting one or more metallocene compound 2 selected from the compounds represented by Formula 1 to Formula 3 with the support supported with the metallocene compound 1 and the co-catalyst 1; and (step d) preparing the supported metallocene catalyst supported with the metallocene compound 1, the metallocene compound 2, the co-catalyst 1, and the co-catalyst 2 by reacting the co-catalyst 2 that is an organic metal compound including boron with the support supported with the metallocene compound 1, the co-catalyst 1 and the metallocene compound 2; in which the supported catalyst is not isolated when polymerizing olefin so that the fouling in a reactor is not generated, and also the present invention can provide the hybrid supported metallocene catalyst having an excellent polymerization activity.

The reaction of the support and the metallocene compound (a3) may use solvent, and the available solvent is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (a3), the reaction temperature may be 0° C. to 100° C. and the reaction time may be preferably 5 minutes to 24 hours.

The step for preparing the support supported with the metallocene compound 1 and the co-catalyst 1 by reacting the co-catalyst 1 that is an organic metal compound including aluminum in the support supported with the metallocene compound 1 (step b3) may be performed with or without solvent.

The available solvent includes aliphatic hydrocarbon solvent, such as hexane and pentane, and aromatic hydrocarbon solvent, such as toluene.

In the above step (b3), the reaction temperature may be −20° C. to 100° C. because the reaction solvent can be existed in a liquid state within the above temperature range, and preferably −10° C. to 100° C., and more preferably 0° C. to 80° C., because the reaction can be optimally performed within the above temperature range. Meanwhile, the reaction time may be 10 minutes to 24 hours.

The support supported with the metallocene compound 1 and the co-catalyst 1 obtained from the above process may be used as it is by removing the reaction solvent through the filtration or the distillation under the reduced pressure, and if necessary, it may be used by soxhlet filtering with aromatic hydrocarbon, such as toluene.

The step (c3) for preparing the support supported with the metallocene compound 1, the co-catalyst 1, and the metallocene compound 2 by reacting one or more metallocene compound selected from the compounds represented by Formula 1 to Formula 3 in the support supported with the metallocene compound 1 and the co-catalyst 1 may use solvent, and the available solvent is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (c3), the reaction temperature may be 0° C. to 100° C. and the reaction time may be preferably 5 minutes to 24 hours.

The step (d) for preparing the supported metallocene catalyst supported with the metallocene compound 1, the metallocene compound 2, the co-catalyst 1, and the co-catalyst 2 by reacting the co-catalyst 2 that is an organic metal compound including boron in the support supported with the metallocene compound 1, the co-catalyst 1 and the metallocene compound 2 may use solvent, and the available solvent is mostly an organic solvent, such as aliphatic hydrocarbon solvent, for example hexane and pentane, aromatic hydrocarbon solvent, for example toluene and benzene, the substituted hydrocarbon solvent, for example dichloromethane, diethylether-based solvent, for example diethylether and THF, acetone, ethylacetrate, and the like, and preferably hexane, heptanes, and toluene.

In the above step (c3), the reaction temperature may be 0° C. to 100° C. and the reaction time may be preferably 5 minutes to 24 hours.

The catalyst supported with the metallocene obtained from the above process may be used as it is by removing the reaction solvent through the filtration or the distillation under the reduced pressure, and if necessary, it may be used by soxhlet filtering with aromatic hydrocarbon, such as toluene.

The polymerization of polyolefin using the supported metallocene catalyst according to the present invention may be performed by using all of the solution process, the slurry or gas-phase process, or the mix process of slurry and gas-phase, and preferably use the slurry or gas-phase process.

The supported metallocene catalyst according to the present invention may be injected by diluting in a type of slurry in aliphatic hydrocarbon solvent of carbon number 5 to 12, for example, pentane, hexane, heptanes, nonane, decane and the isomers thereof, aromatic hydrocarbon solvent, such as toluene and benzene, and the hydrocarbon solvent substituted with chlorine atom, such as dichloromethane and chlorobenzene, which are suitable for the polymerization of olefin. The solvent in here may be preferably used by removing a small dose of water, air, and the like that act as catalytic poison through the treatment of a small dose of alkylaluminum, and it can be possible to further use the co-catalyst.

The olefin-based monomer that can be polymerized by using the supported metallocene catalyst according to the present invention includes ethylene, propylene, alpha olefin, cyclic olefin, and the like, and also diene olefin-based monomer, triene olefin-based monomer, and the like, which have two or more double bonds, can be polymerized. Examples of the above monomers include ethylene, propylene, 1-butene, 1-pentene, 4-methyl-1-pentene, 1-hexene, 1-heptene, 1-decene, 1-undencene, 1-dodecene, 1-tetradecene, 1-hexadecene, 1-icocene, nobonene, nobonadiene, ethylidenenobonene, vinylnobonene, dicyclopentadiene, 1,4-butadiene, 1,5-pentadiene, 1,6-hexadiene, styrene, alpha-methylstyrene, divinylbenzene, 3-chloromethylstyrene, and the like, and the above monomer may be co-polymerized by mixing two or more monomers.

That is, the method according to the present invention may be composed of comprising: preparing the support supported with the co-catalyst 1 by reacting the co-catalyst 1 that is an organic metal compound including aluminum with the support; preparing the support supported with the co-catalyst 1 and the metallocene compound by reacting the support supported with the co-catalyst 1 with the metallocene compound; and preparing the supported metallocene catalyst supported with the metallocene compound, and the co-catalysts 1 and 2 by reacting the co-catalyst 2 that is an organic metal compound including boron with the support supported with the metallocene compound represented by Formula 1 to Formula 3, and the co-catalyst 1; preparing the support supported with the co-catalyst 1 by reacting the co-catalyst 1 that is an organic metal compound including aluminum with the support; preparing the support supported with the co-catalyst 1, and the metallocene compounds 1 and 2 by reacting the metallocene compound represented by Formula 1 or Formula 3 and the metallocene compound represented by Formula 1 with the support supported with the co-catalyst 1; and preparing the metallocene compound supported with the co-catalysts 1 and 2, and the metallocene compounds 1 and 2 by reacting the co-catalyst 2 that is an organic metal compound including boron with the support supported with the co-catalyst 1, and the metallocene compounds 1 and 2; or ore preferably, preparing the support supported with the metallocene compound 1 by reacting one or more metallocene compound 1 selected from the compounds represented by the above Formula 1 to Formula 3 with the support; preparing the support supported with the co-catalyst 1 and the metallocene compound 1 by reacting the co-catalyst 1 that is an organic metal compound including aluminum with the support supported with the metallocene compound 1; preparing the support supported with the metallocene compound 1, the co-catalyst 1, and the metallocene compound 2 by reacting one or more metallocene compound 2 selected from the compounds represented by Formula 1 to Formula 3 with the support supported with the metallocene compound 1 and the co-catalyst 1; and preparing the supported metallocene catalyst supported with the metallocene compound 1, the co-catalyst 1, the metallocene compound 2, and the co-catalyst 2 by reacting the co-catalyst 2 that is an organic metal compound including boron with the support supported with the metallocene compound 1, the co-catalyst 1 and the metallocene compound 2.

At this time, the metallocene compound may be selected from the compound represented by the following Formula 1 to Formula 3:

$$(C_pR^1_aR^m_b)(C_{p'}R^2_{a'}R^n_{b'})_zMQ_k \quad \text{[Formula 1]}$$

$$B\underset{C_{p'}R^2_{a'}R^n_{b'}}{\overset{C_pR^1_aR^m_b}{<}}MQ_2 \quad \text{[Formula 2]}$$

$$B\underset{J}{\overset{C_pR^1_aR^m_b}{<}}MQ_2 \quad \text{[Formula 3]}$$

[In the above Formula 1, 2 or 3,

Cp and Cp' are the same or different one selected from the group consisting of cyclopentadienyl, indenyl, 4,5,6,7-tetrahydro-1-indenyl and fluororenyl radical to each other; $R^m$ and $R^n$ are the same or different hydrogen radical, alkyl radical of carbon number 1~20, cycloalkyl radical of carbon number 3~23, aryl radical of carbon number 6~26, alkenyl radical of carbon number 2~22, alkylaryl radical of of carbon number 7~27, arylalkyl radical of carbon number 7~27, arylalkenyl radical of carbon number 8~28 or alkylsilyl radical of carbon number 1~20; $R^1$ and $R^2$ are the same or different hydrogen radical or hydrocarbyl radical of carbon number 1~6; a, a', b or b' are an integer of 1~4, respectively;

M is a transition metal in group 4B, group 5B or group 6B of the periodic table;

Q is a halogen radical, or alkyl radical of carbon number 1~20, alkenyl radical of carbon number 2~22, aryl radical of carbon number 6~26, alkylaryl radical of carbon number 7~27, arylalkyl radical of carbon number 7~27; or alkylidene radical of carbon number 1~20, k is 2 or 3, z is 0 or 1, and when k is 3, z is 0;

B is one selected from the group consisting of alkyl radical of carbon number 1~4, or hydrocarbyl radical including silicon, germanium, phosphorus, nitrogen, boron or aluminum;

In the Formula 3, J is one selected from the group consisting of $NR^s$, O, $PR^s$ and S, the Rs is alkyl radical of carbon number 1~20 or substituted alkyl radical;

Any one of hydrogen radical located at the $R^m$, $R^n$, B or $R^s$ is the compound represented by Formula 4, 5 or 6]

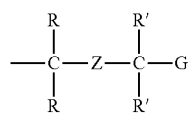

[Formula 4]

[In the above Formula 4,

Z is oxygen atom or sulfur atom, and preferably oxygen atom; R and R' are the same or different hydrogen radical; alkyl radical of carbon number 1~20, cycloalkyl radical of carbon number 3~23, aryl radical of carbon number 6~26, alkenyl radical of carbon number 2~22, alkylaryl radical of of carbon number 7~27, or arylalkyl radical of carbon number 7~27, arylalkenyl radical of carbon number 8~28, or preferably the same or different alkyl radical of carbon number 1~20; two of R' may be connected to each other to form a ring;

G is alkoxy radical of carbon number 1~20, aryloxy of carbon number 6~26, alkylthio of carbon number 1~20, arylthio of carbon number 6~26, phenyl or substituted phenyl of carbon number 1~20, or preferably alkoxyl of carbon number 1~20, and may be connected to R' to form a ring;

When Z is sulfur atom, G should be alkoxy or aryloxy;

When G is alkylthio, arylthio, phenyl or substituted phenyl, Z should be oxygen atom]

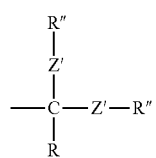

[Formula 5]

[In the above Formula 5,

Z' is oxygen atom or sulfur atom, or preferably oxygen atom, at least one of two Z' is oxygen atom;

R and R" are the same or different alkyl radical of carbon number 1~20, cycloalkyl radical of carbon number 3~23, aryl radical of carbon number 6~26, alkenyl radical of carbon number 2~22, alkylaryl radical of of carbon number 7~27, arylalkyl radical of carbon number 7~27, arylalkenyl radical of carbon number 8~28, or preferably the same or different alkyl radical of carbon number 1~20; two of R' may be connected to each other to form a ring;

R and R", or two R"s may be connected to each other to form a ring]

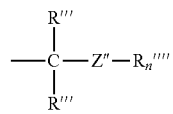

[Formula 6]

[In the above Formula 6,

Z" is oxygen, sulfur, nitrogen, phosphorus or arsenic atom, or preferably oxygen atom;

R'" is the same or different hydrogen radical, alkyl radical of carbon number 1~40, cycloalkyl radical of carbon number 3~43, aryl radical of carbon number 6~46, alkenyl radical of carbon number 2~42, alkylaryl radical of carbon number 7~47, arylalkyl radical of carbon number 7~47 or arylalkenyl radical of carbon number 8~48 to each other, preferably the same or different alkyl radical of carbon number 1~40 to each other;

R"" is hydrogen radical, alkyl radical of carbon number 1~40, aryl radical of carbon number 6~46, alkenyl radical of carbon number 2~42, alkyaryl radical of carbon number 7~47, alkylsilyl radical of carbon number 1~40, arylsilyl radical of carbon number 6~46, phenyl or substituted phenyl of carbon number 6~46 to each other, preferably alkyl radical of carbon number 1~40;

n is 1 or 2, or preferably 1, when Z" is oxygen or sulfur, n is 1; when Z" is nitrogen, phosphorus or arsenic, n is 2]

In the compound represented by the Formula 1 to Formula 3, M is titanium, zirconium or hafnium, Q preferably is halogen, most preferably chlorine, and k preferably is 2.

Meanwhile, the representative example of the metallocene compound represented by the above Formula 1 according to the present invention is [A-O—$(CH_2)_a$—$C_5H_4]_2ZrCl_2$ or [A-O—$(CH_2)_a$—$C_9H_6]ZrCl_3$, in which a is an integer of 4~8, and A may be one selected from the group consisting of methoxymethyl, t-butoxymethyl, tetrahydropyranyl, tetrahydrofuranyl, 1-ethoxyethyl, 1-methyl-1-methoxyethyl and t-butyl.

Meanwhile, for the compound represented by the above Formula 2, B is a structural cross-linking between two $C_p$ rings that gives a steric-rigidity to $C_p$ ring in the catalyst, $C_p$ ring is essentially substituted in a difference way thereby giving a steric difference between two $C_p$ rings, and $R^1{}_aR^m{}_b$ is selected so that $(C_pR^1{}_aR^m{}_b)$ is to be ring that is essentially different from $(C_pR^2{}_aR^n{}_b)$.

According to the preferable Example, the representative example of the metallocene compound represented by the above Formula 2 includes [A-O—$(CH_2)_a$—$C_5H_4]C(CH_3)_2$ [$C_{13}H_8$]$ZrCl_2$, [A-O—$(CH_2)_a$—$C_5H_4$]$Si(CH_3)_2$[$C_{13}H_8$]$ZrCl_2$, [$C_5H_5$]$C(CH_3)$(A-O—$(CH_2)_a$)[$C_{13}H_8$]$ZrCl_2$ or [$C_5H_5$]$Si(CH_3)$(A-O—$(CH_2)_a$)[$C_{13}H_8$]$ZrCl_2$, in which a is an integer of 4~8, and A may be one selected from the group consisting of methoxymethyl, t-butoxymethyl, tetrahydropranyl, tetrahydrofuranyl, 1-ethoxyethyl, 1-methyl-1-methoxyethyl and t-butyl.

According to the preferable example according to the present invention, the representative example of the metallocene compound represented by the above Formula 3 is [(A'-D-(CH$_2$)$_a$)](CH$_3$)X(C$_5$Me$_4$)(NCMe$_3$)] TiCl$_2$, in which X is methylene, ethylene or silicon, D is oxygen or nitrogen atom, and A' may be one selected from the group consisting of hydrogen, alkyl, alkenyl, aryl, alkylaryl, arylalkyl, alkylsilyl, arylsilyl, methoxymethyl, t-butoxymethyl, tetrahydropranyl, tetrahydrofuranyl, 1-ethoxyethyl, 1-methyl-1-methoxyethyl and t-butyl of carbon number 1~20.

The support used for the present invention has hydroxy group and siloxane group having a high reactivity after removing water on the surface through drying. Specifically, silica, silica-alumina, silica-magnesia, and the like that are dried at a high temperature may be used, and they may generally include oxide, carbonate, sulfate, and nitrate components, such as Na$_2$O, K$_2$CO$_3$, BaSO$_4$, Mg(NO$_3$)$_2$. At this time, the drying temperature is 200 to 800° C., preferably 300 to 600° C., and more preferably 300 to 400° C.; when it is less than 200° C., the co-catalyst and water on the surface may be reacted due to a large quantity of water; and when it exceeds 800° C., it is not desirable because the hydroxy group is largely disappeared and the siloxane group only is left so that the site reacted with the co-catalyst is decreased.

The co-catalyst 1 represented by the following Formula 7 is an organic metal compound including aluminum, and is the same with the co-catalyst used for polymerizing olefin under the presence of the general metallocene catalyst. When the above co-catalyst 1 is supported, the hydroxy group supported in the support will be bound with the aluminum metal.

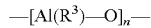  [Formula 7]

[In the above Formula 7,

R$^3$ is the same or different halogen radical, hydrocarbyl radical of carbon number 1 to 20 or hydrocarbyl radical of carbon number 1 to 20 substituted with halogen to each other, and n is an integer of above 2]

The compound represented by the above Formula 7 may be existed in a type of linear, circle, or net, and the example of the above compound includes methylaluminoxane (MAO), ethylaluminoxane, isobutylaluminoxane, butylaluminoxane, and the like.

Since then, a borate-based compound including boron represented by Formula 8 is supported as a second co-catalyst so that the supported metallocene catalyst can be prepared.

  [Formula 8]

[In the above Formula 8,

T$^+$ is a polyatomic ion having a valency of +1; B is boron in an oxidation state of +3 form; and Q is independently selected from the group consisting of hydride, dialkylamido, halide, alkoxide, aryloxide, hydrocarbyl, halocarbyl and halo-substituted-hydrocarbyl radical, respectively, and the above Q has below 20 carbons, but only Q in below one location is halide]

Non-limited example of ion forming compound including proton donating cation that can be used as an activation co-catalyst in preparing the catalyst according to the present invention as the example of the compound represented by the above Formula 8 includes a trisubstituted ammonium salt, such as trimethylammonium tetraphenylborate, methyloctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, and N,N-dimethyl-(2,4,6-trimethylanilinium)tetrakis-(2,3,4,6-tetrafluorophenyl)borate; dialkyl ammonium salt, such as dioctadecylammonium tetrakis(pentafluorophenyl)borate, ditetradecylammonium tetrakis(pentafluorophenyl)borate and dicyclohexylammonium tetrakis(pentafluorophenyl)borate; and a trisubstituted phosphonium salt, such as triphenylphosphonium tetrakis(pentafluorophenyl)borate, methyloctadecylphosphonium tetrakis(pentafluorophenyl)borate and tri(2,6-dimethylphenyl)phosphonium tetrakis(pentafluorophenyl)borate. It is preferable to use a long-chain alkyl monosubstituted and disubstituted ammonium complex, especially, C$_{14}$-C$_{20}$ alkyl ammonium, especially, methyldi(octadecyl)ammonium tetrakis(pentafluorophenyl)borate and methyldi(tetradecyl)-ammonium tetrakis(pentafluorophenyl)borate, or the mixture including the same. The above mixture includes a protonized ammonium cation derived from amine including one alkyl group and two C$_{14}$, C$_{16}$ or C$_{18}$ alkyl groups. The above amine is available as Kemamine T9701 that is a registered trademark in Witco Corp. and Armeen M2HT that is a registered trademark in Akzo-Nobel.

Meanwhile, the mole ratio of [boron]/[transition metal] in the supported metallocene catalyst may be 0.01 to 1,000, preferably 0.1 to 100, and more preferably 0.2 to 10; when the above mole ratio is less than 0.01, the effect on increasing activity is very low due to a low content of boron; and when it exceeds 1,000, the activity is not increased any more, and the content of borate that is remained but not supported is increased so that it can lead to the fouling in a reactor during the polymerization.

In addition, the supported metallocene catalyst prepared according to the present invention can be used in the polymerization of olefin as it is, and separately, the catalyst is contacted with olefin-based monomer, such as ethylene, propylene, 1-butene, 1-hexene, 1-octene, and the like so that the pre-polymerized catalyst may be prepared and then used.

The organic reagents and solvents that were required for the polymerization and the producing of the catalyst in the following Examples were the products obtained from Aldrich Company, which were purified through the standard method, ethylene having a high purity obtained from Applied Gas Technology Company was used, it was polymerized after passing through water and oxygen filtering machine, and the contact with air and water was blocked all of the catalyst synthesis, supporting and polymerizing so that the reproducibility of experiment was increased.

Meanwhile, in order to verify the structure of catalyst, the spectrum was obtained by using 300 MHz NMR (Bruker).

Meanwhile, in order to analyze the supported catalyst, ICP-AES (Inductively Coupled Plasma Atomic Emission Spectrometer) that is a model of XMP integra produced from GBC Company was used. From the above ICP analysis, the contents of zirconium and boron of filtrates after the reaction with the supported catalyst could be known.

Advantageous Effects

According to the method for preparing the supported metallocene catalyst of the present invention, there are effects such that the supported metallocene catalyst prepared from the simple process can be applied for the polymerization of polyolefin that is polymerized at low pressure or high pressure, the molecular weight distribution of the prepared polyolefin can be controlled, and the activity of catalyst is significantly high as compared with the existed supported metallocene catalyst and the distribution of the molecular weight can be easily controlled by preventing the fouling on preparing.

BEST MODE

Hereinafter, the present invention will be described in more detail with reference to the preferable examples, but is not limited thereto.

Hereinafter, the preferable example will be described in order to understand the present invention, but the following examples are only for describing the example of the present invention, and it is apparently understood by the person who is skilled in the art that various modifications and amendments within the range of the technique spirit and the scope of the present invention can be possible and the modifications and amendments belong in the attached claims.

MODE FOR INVENTION

Example

The organic reagents and solvents that were required for the polymerization and the producing of the catalyst in the following Examples were the products obtained from Aldrich Company, which were purified through the standard method, ethylene having a high purity obtained from Applied Gas Technology Company was used, it was polymerized after passing through water and oxygen filtering machine, and the contact with air and water was blocked all of the catalyst synthesis, supporting and polymerizing so that the reproducibility of experiment was increased.

Synthesis of Metallocene Compound

<Synthetic Example 1> Synthesis of [t-Bu-O—(CH$_2$)$_6$—C$_5$H$_4$]$_2$ZrCl$_2$ t-Butyl-O—(CH$_2$)$_6$—Cl was produced by using 6-chlorohexanol in a method disclosed in the document that is Tetrahedron Lett. 2951 (1988), and was reacted with NaCp to obtain t-Butyl-O—(CH$_2$)$_6$—C$_5$H$_5$ (Yield: 60%, b.p. 80° C./0.1 mmHg). In addition, t-Butyl-O—(CH$_2$)$_6$—C$_5$H$_5$ was dissolved in THF at −78° C.; normal butyl lithium (n-BuLi) was slowly added, and then its temperature was increased to a room temperature; and then reacted for 8 hours. The above solution was again reacted at a room temperature for further 6 hours after slowly adding a pre-synthesized lithium salt in a suspension solution of ZrCl$_4$(THF)$_2$ (1.70 g, 4.50 m mol)/THF (30 ml) at −78° C. All of volatile materials were dried in a vacuum, and then the oil liquid material obtained was filtered by adding hexane solvent. After drying the filtered solution in a vacuum, hexane was added to precipitate at a low temperature (−20° C.). The precipitate obtained was filtered to obtain [tBu-O—(CH$_2$)$_6$—C$_5$H$_4$]$^2$ZrCl$_2$ compound in a type of white solid material (Yield: 92%).

1 H NMR (300 MHz, CDCl3): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

13 C NMR (CDCl$_3$): 135.09, 116.66, 112.28, 72.42, 61.52, 30.66, 30.61, 30.14, 29.18, 27.58, 26.00.

<Synthetic Example 2> Synthesis of [methyl(6-t-buthoxyhexyl)silyl(η$^5$-tetramethylCp)(t-Butylamido) TiCl$_2$ After 50 g of Mg (s) was added to 10 L reactor at a room temperature, 300 mL of THF was added. After 0.5 g of I$_2$ was added, the temperature of the reactor was maintained at 50° C. After stabilizing the temperature of the reactor, 250 g of 6-t-buthoxyhexyl chloride was added in a rate of 5 mL/min by using a feeding pump to the reactor. According to the adding of 6-t-buthoxyhexylchloride, it could be observed that the temperature of the reactor was increased to about 4~5° C. While 6-t-buthoxyhexylchloride was continually added, the stirring was maintained for 12 hours. After 12 hours of the reaction, the black reaction solution could be obtained. After taking 2 mL of the prepared black solution, water was added to obtain an organic layer so that it could be known that 6-t-buthoxyhexane could be confirmed through 1H-NMR and Grignard reaction was satisfactorily progressed from 6-t-buthoxyhexane. And then, 6-t-buthoxyhexyl magnesium chloride was synthesized. 500 g of MeSiCl$_3$ and 1 L of THF were added to the reactor, and then the temperature was cooled to −20° C. 560 g of the synthesized 6-t-buthoxyhexyl magnesium chloride was added in a rate of 5 mL/min by using the feeding pump. After finishing the injection of Grignard reagent, the stirring was performed for 12 hours while the temperature of the reactor was gradually increased to a room temperature. After 12 hours of the reaction, it could be observed that MgCl$_2$ salt having a white color was produced. A filter solution could be obtained by removing salt through Press dewatering Filtration machine for experiment (labdori, HanKang Engineering Co.) by adding 4 L of hexane. After adding the obtained filter solution to the reactor, the liquid having a light yellow color could be obtained by adding hexane at 70° C. It could be confirmed that the obtained liquid was a required methyl(6-t-toxyhexyl)dichlorosilane compound through 1H-NMR.

1 H NMR (CDCl$_3$): 3.3 (t, 2H), 1.5 (m, 3H), 1.3 (m, 5H), 1.2 (s, 9H), 1.1 (m, 2H), 0.7 (s, 3H).

After 1.2 mole (150 g) of tetramethylcyclopentadiene and 2.4 L of THF were added to the reactor, the temperature was cooled to −20° C. 480 mL of n-BuLi was added in a rate of 5 mL/min to the reactor by using the feeding pump. After adding n-BuLi, the stirring was maintained for 12 hours while the temperature of the reactor was gradually increased to a room temperature. After 12 hours of the reaction, an equivalent Methyl(6-t-buthoxyhexyl)dichlorosilane (326 g, 350 mL) was quickly added to the reactor. While the temperature of the reactor was gradually increased to a room temperature, the stirring was maintained for 12 hours; the temperature of the reactor was again cooled to 0° C.; and then 2 equivalent t-BuNH$_2$ was added. The reactor was stirred for 12 hours while the temperature of the reactor was gradually increased to a room temperature. After 12 hours of the reaction, THF was removed; and then the filter solution without salt could be obtained through Labdori by adding 4 L of hexane. After the filter solution was again added to the reactor, the solution having a yellow color could be obtained by removing hexane at 70° C. It could be confirmed that the obtained solution having a yellow color was Methyl(6-t-buthoxyhexyl)(tetramethylCpH)t-Butylaminosilane compound through 1H-NMR.

TiCl$_3$(THF)$_3$ (10 mmol) was quickly added to dilithium salt of ligand of −78° C. that is synthesized in THF solution from n-BuLi and ligand Dimethyl(tetramethylCpH)t-Butylaminosilane. While the reaction solution was gradually increased from −78° C. to a room temperature, the stirring was maintained for 12 hours. After stirring for 12 hours, the stirring was maintained for 12 hours after adding an equivalent PbCl$_2$ (10 mmol) to the reactor at a room temperature. After stirring for 12 hours, the solution having a greenish heavy black color could be obtained. After THF was removed from the produced reaction solution, the product was filtered by adding hexane. After removing hexane from the obtained filter solution, it could be confirmed as the required [methyl(6-t-buthoxyhexyl)silyl($\eta^5$-tetramethylCp)(t-Butylamido)]TiCl$_2$ compound through 1H-NMR.

1H-NMR (CDCl$_3$): 3.3 (s, 4H), 2.2 (s, 6H), 2.1 (s, 6H), 1.8~0.8 (m), 1.4 (s, 9H), 1.2 <136> (s, 9H), 0.7 (s, 3H)

<Synthetic Example 3> Preparation of [(CH$_2$)$_4$—C$_5$H$_4$]$_2$ZrCl$_2$

It purchased from Aldrich Company was used.

<Synthetic Example 4> Synthesis of 6-t-butoxyhexylmethylsilylbisindenyl zirconium dichloride After 17.5 ml of 2.5M n-BuLi solution was injected in 5 ml of indene that is dissolved in 20 ml of ether for 20 minutes at 0° C., the stirring was maintained for 2 hours at a room temperature. After 5.25 g of t-buthoxyhexylmethyldichlorosilane was dissolved in 10 ml of hexane, it was added to a indenyllithium solution over 10 minutes at −78° C. After the reaction solution was stirred for 3 hours at a room temperature, lithium chloride was removed by filtering and the solvent was dried in a vacuum thereby obtaining the product that is mixed with a structural isomer. The structural isomer was confirmed through 1H NMR.

$^1$H NMR (500 MHz, CDCl$_3$): 1.17 (t-BuO, 9H, s), 3.59 (Indene, 2H, m), 0.21 (MeSi, 3H, s), 0.47 (CH$_2$, 2H, m), 0.89 (CH$_2$, 2H, m), 1.28 (CH$_2$, 2H, m), 1.56 (CH$_2$, 4H, m), 3.26 (OCH$_2$, t, JHH=0.014), 7.48 (ArH, 2H, m), 7.38 (ArH, 2H, m), 7.26 (ArH, 2H, m), 7.16 (ArH, 2H, m), 6.90 (indene, H, m), 6.60 (ArH, 2H, m).

The material that was confirmed through $^1$H NMR as mentioned above was dissolved in 40 ml of ether, and then injected to 17.5 ml of 2.5 M n-BuLi solution for 20 minutes at −78° C. After stirring for 3 hours at a room temperature, the product was obtained by filtering after solidifying by adding hexane. 1 g of zirconium chloride was added to 20 ml of toluene, and then stirred. 30 ml of toluene/ether 1:2 solution was added to 2.3 g of the ligand solid that was obtained from the above process, and then was injected to the zirconium chloride mix solution for 20 minutes at −78° C. After stirring for 16 hours at a room temperature, it was filtered. The final catalyst was obtained by the re-crystallization of the material with hexane.

$^1$H NMR (500 MHz, C$_6$D$_6$): 1.15 (t-BuO, 9H, s), 1.12 (MeSi, 3H, s), 1.34 (CH$_2$, 6H, m), 1.47 (CH$_2$, 2H, m), 1.60 (CH$_2$, 2H, m), 3.26 (OCH$_2$, t, JHH=0.014, 7.40 (ArH, 2H, m), 7.33 (ArH, 2H, m), 7.28 (ArH, 2H, m), 7.16 (ArH, 2H, m), 6.90 (indene, H, m), 5.83 (ArH, 2H, m)

<Synthetic Example 5> Synthesis of [t-Bu-O—(CH$_2$)$_6$—C$_5$H$_4$]$_2$HfCl$_2$ t-Butyl-O—(CH$_2$)$_6$—Cl was prepared from the method disclosed in the document (Tetrahedron Lett. 2951 (1988)) by using 6-chlorohexanol, and was reacted with NaCp to obtain t-Butyl-O—(CH$_2$)$_6$—C$_5$H$_5$ (Yield: 60%, b.p. 80° C./0.1 mmHg). In addition, t-Butyl-O—(CH$_2$)$_6$—C$_5$H$_5$ was dissolved in THF at −78° C.; a normal butylilthium (n-BuLi) was gradually added; the temperature was increased to a room temperature; and then was reacted for 8 hours. The above solution was again reacted at a room temperature for further 6 hours after slowly adding a pre-synthesized lithium salt in a suspension solution of HfCl4 (1.44 g, 4.50 m mol)/THF (30 ml) at −78° C. All of volatile materials were dried in a vacuum, and then the oil liquid material obtained was filtered by adding hexane solvent. After drying the filtered solution in a vacuum, hexane was added to precipitate at a low temperature (−20° C.). The precipitate obtained was filtered to obtain [tBu-O—(CH$_2$)$_6$—C$_5$H$_4$]$_2$HfCl$_2$ compound in a type of white solid material (Yield: 88%).

$^1$H-NMR (300 MHz, CDCl3): 6.19 (t, J=2.6 Hz, 2H), 6.08 (t, J=2.6 Hz, 2H), 3.31 (t, 6.6 Hz, 2 H), 2.65 (t, J=8 Hz), 1.56-1.48 (m, 4H), 1.34 (m, 4H), 1.17 (s, 9H).

$^{13}$C-NMR (CDCl$_3$): 134.09, 116.06, 111.428, 72.42, 61.33, 30.42, 30.67, 30.14, 29.20, 27.52, 26.01.

Production Example of Preparation of Catalyst that is Composed of Co-Catalyst 1 Layer+Metallocene Catalyst Layer+Co-Catalyst 2 Layer Production Example 1

10 ml of Toluene was added to 3 g of silica (Sylopol 2212, Grace Davison) having 280 m$^2$/g surface area and 1.47 ml/g pore volume that is plasticized; was reacted with MAO 15 ml (10 wt % Toluene solution) for 2 hours at 70° C.; and then removed with non-reacted MAO solution by washing with toluene. After it was reacted with 0.72 mmole of metallocene compound having tert butoxy-group obtained from Synthetic Example 1 for 1 hour at 50° C., it was washed with toluene. And then, it was reacted with 1.2 mmole of trityl tetrakis (penta-fluoro-phenyl)borate (TB) for 1 hour at 50° C.; and then the catalyst in a state of solid was prepared by drying under the reduced pressure at 50° C. The mole ratio of boron (B)/transition metal (Zr) was 1.3.

Production Example 2

The same method with Production Example 1 was used except treating 0.6 mmole of treating trityl tetrakis (penta-fluoro-phenyl)borate (TB). The mole ratio of boron (B)/transition metal (Zr) was 0.7.

Production Example 3

The same method with Production Example 1 was used except treating 0.15 mmole of treating trityl tetrakis (penta-fluoro-phenyl)borate (TB). The mole ratio of boron (B)/transition metal (Zr) was 0.2.

Production Example 4

The same method with Production Example 1 was used except using Dimethylanilinium Tetrakis(pentafluorophenyl)borate Trityl (AB) instead of TB.

Production Example 5

The same method with Production Example 1 was used except using the metallocene compound having tert butoxy-group obtained from Synthetic Example 2 instead of the metallocene compound obtained from Synthetic Example 1.

Production Example 6

The same method with Production Example 1 was used except using Bis indenyl-based metallocene compound obtained from Synthetic Example 4 instead of the metallocene compound obtained from Synthetic Example 1.

Production Comparative Example 1

The same method with Production Example 1 was used except 30 ml of MAO instead of 15 ml of MAO and not treating TB.

Production Comparative Example 2

The same method with Production Example 1 was used except that 15 ml of MAO (10 wt % of toluene solution) was reacted for 1 hour at 50° C.; was washed with toluene to remove non-reacted MAO; was decompressed at 50° C.; and then dried, instead of trityl tetrakis (penta-fluoro-phenyl) borate (TB).

Production Comparative Example 3

The same method with Production Example 5 was used except not treating TB.

Production Comparative Example 4

The same method with Production Example 1 was used except using the metallocene compound obtained from Synthetic Example 3.

Production Comparative Example 5

The same method with Production Example 4 was used except not treating TB.

Production Comparative Example 6

The same method with Production Example 6 was used except not treating TB.

<Preparation and Evaluation of Physical Property of Polyethylene>

Example 1

3 L of normal hexane was injected to high-pressure reactor having 5 L volume while not contacting with air and oxygen; triethylaluminium was injected to be 0.6 mmol/L triethylaluminum concentration about normal hexane; and then 30 mg of the catalyst in a state of solid obtained from Production Example 1 was injected. And then, ethylene was continuously injected at 80° C. to polymerize for 2 hours while maintaining 9 bar of pressure. And then, the supply of ethylene was stopped and the pressure was removed to finish the reaction. The suspension obtained from the above process was isolated and dried to prepare the polyethylene particle.

Example 2

The same method with Example 1 was used except using the catalyst obtained from Production Example 2 instead of the catalyst obtained from Production Example 1.

Example 3

The same method with Example 1 was used except using the catalyst obtained from Production Example 3 instead of the catalyst obtained from Production Example 1.

Example 4

The same method with Example 1 was used except using the catalyst obtained from Production Example 4 instead of the catalyst obtained from Production Example 1.

Example 5

The same method with Example 1 was used except using the catalyst obtained from Production Example 5 instead of the catalyst obtained from Production Example 1.

Example 6

The same method with Example 1 was used except using the catalyst obtained from Production Example 6 instead of the catalyst obtained from Production Example 1.

Example 7

The same method with Example 1 was used except injecting 30 mg the catalyst in a state of solid obtained from Production Comparative Example 1 instead of the catalyst obtained from Production Example 1, and then further injecting TB having an amount corresponding to B/Zr=2 as a mole ratio.

Example 8

The same method with Example 1 was used except the ethylene polymerization at 40 bar.

Example 9

The same method with Example 1 was used except using AB instead of TB.

Comparative Example 1

The same method with Example 1 was used except using the catalyst obtained from Production Comparative Example 1 instead of the catalyst obtained from Production Example 1.

Comparative Example 2

The same method with Example 1 was used except using the catalyst obtained from Production Comparative Example 4 instead of the catalyst obtained from Production Example 1.

Comparative Example 3

The same method with Example 1 was used except using the catalyst obtained from Production Comparative Example 3 instead of the catalyst obtained from Production Example 1.

Comparative Example 4

The same method with Example 1 was used except using the catalyst obtained from Production Comparative Example 5 instead of the catalyst obtained from Production Example 1.

Comparative Example 5

The same method with Example 1 was used except using the catalyst obtained from Production Comparative Example 6 instead of the catalyst obtained from Production Example 1.

Comparative Example 6

The same method with Example 1 was used except using the catalyst obtained from Production Comparative Example 2 instead of the catalyst obtained from Production Example 1.

Comparative Example 7

The same method with Comparative Example 1 was used except the ethylene polymerization at 40 bar.
Evaluation of Physical Property
1) Melt Index (MI, 2.16 kg): Evaluation Temperature 190° C., Evaluation based on ASTM 1238.
2) High Load Melt Index (HLMI, 21.16 kg): Evaluation Temperature 190° C., Evaluation based on ASTM 1238.
3) MFR (HLMI/MI): The ratio is divided HLMI Melt Index (MI, 21.6 kg Load) by MI (MI, 2.16 kg Load).

Table 1 is a low-pressure polymerization property, in which the pressure was 9 bar on ethylene polymerizing, and Table 2 is a high-pressure polymerization property, in which the pressure was 40 bar on ethylene polymerizing.

TABLE 1

| Section | Borate Co-catalyst | Supported Metallocene Catalyst | Activity (KgPE/gCat) | MI (2.16 Kg) (g/10 min) | MFR |
|---|---|---|---|---|---|
| Example 1 | TB | Pro. Ex. 1 | 39 | 1.2 | 17 |
| Example 2 | TB | Pro. Ex. 2 | 36 | 0.85 | 18 |
| Example 3 | TB | Pro. Ex. 3 | 7 | 0.69 | 19 |
| Example 4 | AB | Pro. Ex. 4 | 31 | 1.1 | 17 |
| Example 5 | TB | Pro. Ex. 5 | 3.5 | <0.1 | — |
| Example 6 | TB | Pro. Ex. 6 | 4.5 | 0.68 | 35 |
| Example 7 | after TB | Pro. Com. Ex. 1 | 9.4 | 0.4 | 22 |
| Com. Ex. 1 | — | Pro. Com. Ex. 1 | 3.1 | 0.78 | 17 |
| Com. Ex. 2 | TB | Pro. Com. Ex. 4 | 0.3 | 1.1 | 18 |
| Com. Ex. 3 | — | Pro. Com. Ex. 3 | 0.9 | <0.1 | — |
| Com. Ex. 4 | — | Pro. Com. Ex. 5 | 0.7 | 1.2 | 17 |
| Com. Ex. 5 | — | Pro. Com. Ex. 6 | 0.5 | 0.16 | 49 |
| Com. Ex. 6 | — | Pro. Com. Ex. 2 | 10 | 0.75 | 23 |

For Table 1, TB is trityl tetrakis (penta-fluoro-phenyl)borate, and AB is Dimethylanilinium Tetrakis(pentafluoro-phenyl)borate Trityl.
For Table 1, in the case of Example 5 and Comparative Example 3, HLMI as well as MI were not evaluated due to the very high molecular weight of polyethylene produced.

TABLE 2

| Section | Borate Co-catalyst | Supported Metallocene Catalyst | Activity (KgPE/gCat) | HLMI (21.6 kg) (g/10 min) | MFR |
|---|---|---|---|---|---|
| Example 8 | TB | Pro. Ex. 1 | 78 | 1.8 | 18 |
| Example 9 | AB | Pro. Ex. 4 | 102 | 1.5 | 18 |
| Com. Ex. 7 | — | Pro. Com. Ex. 1 | 12 | 0.61 | 21 |

As shown in Table 1, in the case of polymerizing using Example 1 to 4 that were the supported catalyst supported with further 0.2 to 1.3 of Borate (AB, TB) as a mole ratio as compared to Zr using Synthetic Example 1, its activity was increased in 2 to 13 times, as compared with in the case of polymerizing using Comparative Example 1 that was the catalyst not applied with Borate. As compared with Comparative Example 6, in which its activity was increased by further treating MAO, the activity in Example 1 was increased in about 4 times.

As compared with Comparative Example 2 that was not applied with Borate, the activity of Example 1 that was further not supported with 1.3 of TB as a mole ratio as compared to Zr using Synthetic Example 5 was increased in about 4 times. However, the activity of Comparative Example 2 that was polymerized by using the supported catalyst using Synthetic Example 3 without alkoxy alkyl ligand was decreased than the activity of Comparative Example 4.

It could be confirmed that Example 7 was prepared through the method for injecting Borate on polymerizing, not applying to the catalyst, and the activity was increased in about 3 times as compared with Comparative Example 1.

As shown in Table 2, it could be confirmed that the activity of the high pressure polymerization was increased in 6 to 9 times as compared with Comparative Example 7, as the above results in the case of the supported catalyst applied with Borate, like Example 8 and Example 9.

Production Example of Preparation of Catalyst that is Composed of Co-Catalyst 1 Layer+Metallocene Catalyst 1 Layer+Metallocene Catalyst 2 Layer+Co-Catalyst 2 Layer

Production Example 7

10 ml of Toluene was added to 3 g of silica (Sylopol 2212, Grace Davison) having 280 m²/g surface area and 1.47 ml/g pore volume that is plasticized; was reacted with MAO 15 ml (10 wt % Toluene solution) for 2 hours at 70° C.; and then removed with non-reacted MAO solution by washing with toluene. After it was reacted with 0.48 mmole of metallocene compound having tert butoxy-group obtained from Synthetic Example 1 and 0.24 mmole of metallocene compound obtained from Synthetic Example 2 for 1 hour at 50° C., it was washed with toluene. And then, it was reacted with 1.2 mmole of trityl tetrakis (penta-fluoro-phenyl)borate (TB) for 1 hour at 50° C.; and then the catalyst in a state of solid was prepared by drying under the reduced pressure at 50° C.

Production Comparative Example 7

The same method with Example 7 was used except using 0.72 mmole of metallocene compound having tert butoxy-group obtained from only Synthetic Example 1 instead of the metallocene compound obtained from Synthetic Example 1 and the metallocene compound obtained from Synthetic Example 2.

Production Comparative Example 8

The same method with Example 7 was used except using 0.72 mmole of metallocene compound having tert butoxy-group obtained from only Synthetic Example 2 instead of the metallocene compound obtained from Synthetic Example 1 and the metallocene compound obtained from Synthetic Example 2.

Production Comparative Example 9

The same method with Example 7 was used except not treating TB.

<Preparation and Evaluation of Physical Property of Polyethylene>

Example 10

3 L of normal hexane was injected to high-pressure reactor having 5 L volume while not contacting with air and oxygen; triethylaluminium was injected to be 0.6 mmol/L triethylaluminum concentration about normal hexane; and then 30 mg of the catalyst in a state of solid obtained from Production Example 7 was injected. And then, ethylene was continuously injected at 80° C. to polymerize for 2 hours while maintaining 9 bar of pressure. And then, the supply of ethylene was stopped and the pressure was removed to finish the reaction. The suspension obtained from the above process was isolated and dried to prepare the polyethylene particle.

Comparative Example 8

The same method with Example 10 was used except using the catalyst having tert-butoxy group obtained from Production Comparative Example 7 instead of the catalyst obtained from Production Example 7.

Comparative Example 9

The same method with Example 10 was used except using the catalyst having tert-butoxy group obtained from Production Comparative Example 8 instead of the catalyst obtained from Production Example 7.

Comparative Example 10

The same method with Example 10 was used except using the catalyst having tert-butoxy group obtained from Production Comparative Example 9 instead of the catalyst obtained from Production Example 7.

Example 11

The same method with Example 10 was used except the ethylene polymerization at 40 bar.

Comparative Example 11

The same method with Comparative Example 8 was used except the ethylene polymerization at 40 bar.

Comparative Example 12

The same method with Comparative Example 10 was used except the ethylene polymerization at 40 bar.

Table 3 is a low-pressure polymerization property, in which the pressure was 9 bar on ethylene polymerizing, and Table 4 is a high-pressure polymerization property, in which the pressure was 40 bar on ethylene polymerizing.

TABLE 3

| Section | Metallocene Catalyst (Syn. Ex.) | Borate Co-catalyst | Supported Metallocene Catalyst | Activity (KgPE/gCat) | MI (2.16 Kg) (g/10 min) | MFR |
|---|---|---|---|---|---|---|
| Example 10 | 1 and 2 | TB | Pro. Ex. 7 | 36 | 1.1 | 21 |
| Com. Ex. 8 | 1 | TB | Pro. Com. Ex. 7 | 39 | 1.2 | 17 |
| Com. Ex. 9 | 2 | TB | Pro. Com. Ex. 8 | 3.5 | <0.1 | — |
| Com. Ex. 10 | 1 and 2 | — | Pro. Com. Ex. 9 | 2.7 | 0.74 | 23 |

For Table 3, TB is trityl tetrakis (penta-fluoro-phenyl) borate. For Table 3, HLMI as well as MI were not exactly evaluated in the case of Comparative Example 9 due to the very high molecular weight of polyethylene produced.

TABLE 4

| Section | Metallocene Catalyst (Syn. Ex.) | Borate Co-catalyst | Supported Metallocene Catalyst | Activity (KgPE/gCat) | HLMI (21.6 kg) g/10 min | MFR |
|---|---|---|---|---|---|---|
| Example 11 | 1 and 2 | TB | Pro. Ex. 7 | 87 | 1.2 | 22 |
| Com. Ex. 11 | 1 | TB | Pro. Com. Ex. 8 | 78 | 1.8 | 18 |
| Com. Ex. 12 | 1 and 2 | — | Pro. Com. Ex. 10 | 10 | 0.35 | 23 |

Referring with Table 3 and Table 4, the activity of the catalyst in the case of further supporting Borate like Example 10 and Example 11 was increased as compared with the case of using only MAO like Comparative Example 10 and Comparative Example 12 for preparing the supported metallocene catalyst.

Meanwhile, there was a disadvantage such that MFR of polymer using the supported catalyst supported with the single metallocene compound like Comparative Example 8 and Comparative Example 11 was small. However, MFR of polymer in the case of polymerizing ethylene using the hybrid supported metallocene catalyst supported with two or more metallocene compound at the same time like Example 10 and Example 11 could be made to be large, and also MFR of polymer in the case of using the supported catalyst supported with various two or more metallocene compounds at the same time could be controlled.

Therefore, the activity of the catalyst can be controlled by adjusting the component ratio of each metallocene catalyst in the hybrid supported metallocene catalyst according to the present invention, the polymer having various physical properties and molecular weight distributions can be prepared, and finally it means that the metallocene supported catalyst that can control the distribution of molecular weight can be prepared in a single reactor.

Production Example of Preparation of Catalyst that is Composed of Metallocene Catalyst 1 Layer+Co-Catalyst 1 Layer+Metallocene Catalyst 2 Layer+Co-Catalyst 2 Layer Production Example 8

10 ml of Toluene was added to 3 g of silica (Sylopol 2212, Grace Davison) having 280 m²/g surface area and 1.47 ml/g pore volume that is plasticized; was added and reacted with 0.36 mmole of the metallocene compound having tert butoxy-group obtained from Synthetic Example 1 for 1 hours at 70° C.; and then washed by using toluene. It was reacted with 15 ml of MAO (10 wt % toluene solution) for 2 hours at 70° C., and was removed with non-reacted MAO solution by washing with toluene. After it was reacted with 0.36 mmole of metallocene compound obtained from Synthetic Example 2 for 1 hour at 50° C., it was washed with toluene. And then, it was reacted with 1.2 mmole of trityl tetrakis (penta-fluoro-phenyl)borate (TB) for 1 hour at 50° C.; and then the catalyst in a state of solid was prepared by drying under the reduced pressure at 50° C.

Production Example 9

The same method with Production Example 8 was used except using the metallocene compound obtained from Synthetic Example 2 instead of the metallocene compound obtained from Synthetic Example 1 and using the metallocene compound obtained from Synthetic Example 1 instead of the metallocene compound obtained from Synthetic Example 2.

Production Example 10

The same method with Production Example 8 was used except using 0.18 mole of the metallocene compound obtained from Synthetic Example 1 and 0.18 mmole of the metallocene compound obtained from Synthetic Example 2 instead of 0.36 mmole of the metallocene compound obtained from Synthetic Example 1 and using 0.18 mole of the metallocene compound obtained from Synthetic Example 1 and 0.18 mmole of the metallocene compound obtained from Synthetic Example 2 instead of the metallocene compound obtained from Synthetic Example 2.

Production Comparative Example 10

10 ml of Toluene was added to 3 g of silica (Sylopol 2212, Grace Davison) having 280 m²/g surface area and 1.47 ml/g pore volume that is plasticized; was reacted with MAO 15 ml (10 wt % Toluene solution) for 2 hours at 70° C.; and then removed with non-reacted MAO solution by washing with toluene. After it was reacted with 0.36 mmole of metallocene compound having tert butoxy-group obtained from Synthetic Example 1 for 1 hour at 50° C., it was washed with toluene. And then, after it was reacted with 0.36 mmole of the metallocene compound obtained from Synthetic Example 2 for 1 hour at 50° C., it was washed with toluene. Since then, it was reacted with 1.2 mmole of trityl tetrakis (penta-fluoro-phenyl)borate (TB) for 1 hour at 50° C.; and then the catalyst in a state of solid was prepared by drying under the reduced pressure at 50° C.

<Preparation and Evaluation of Physical Property of Polyethylene>

Example 12

3 L of normal hexane was injected to high-pressure reactor having 5 L volume while not contacting with air and oxygen; triethylaluminium was injected to be 0.6 mmol/L triethylaluminum concentration about normal hexane; and then 30 mg of the catalyst in a state of solid obtained from Production Example 8 was injected. And then, ethylene was continuously injected at 80° C. to polymerize for 2 hours while maintaining 9 bar of pressure. And then, the supply of ethylene was stopped and the pressure was removed to finish the reaction. The suspension obtained from the above process was isolated and dried to prepare the polyethylene particle.

Example 13

The same method with Example 12 was used except using the catalyst prepared from Production Example 9.

Example 14

The same method with Example 12 was used except using the catalyst prepared from Production Example 10.

Comparative Example 13

The same method with Example 12 was used except using the catalyst prepared from Production Comparative Example 10.

TABLE 5

| Section | Metallocene Catalyst (Syn. Ex.) | Borate Co-catalyst | Supported Metallocene Catalyst | Activity (KgPE/gCat) | MI (2.16 Kg) (g/10 min) | MFR |
|---|---|---|---|---|---|---|
| Example 12 | 1 and 2 | TB | Pro. Ex. 8 | 45 | 0.2 | 38 |
| Example 13 | 1 and 2 | TB | Pro. Ex. 9 | 40 | 0.6 | 27 |
| Example 14 | 1 and 2 | TB | Pro. Ex. 10 | 42 | 0.9 | 32 |
| Com. Ex. 13 | 1 and 2 | TB | Pro. Com. Ex. 10 | 25 | 1.1 | 23 |

For Table 5, TB is trityl tetrakis (penta-fluoro-phenyl) borate. Referring with Table 5, for preparing the metallocene supported catalyst using two metallocene compounds including alkoxide ligand, the polyethylene having high molecular weight and broad molecular weight distribution could be prepared like Example 12 to Example 14 in the case of the metallocene supported catalyst prepared by firstly supporting with one metallocene compound or a part of two metallocene compounds, secondly supporting with MAO, and then supporting with the remained metallocene compound, like Production Example 8 to Production Example 10, as compared with in the case of preparing the catalyst by firstly supporting with MAO and then supporting metallocene compound like Comparative Example 10. In addition, the activity could be increased to about 70 to 80%.

Therefore, the polymer that can control the activity of the catalyst, has various physical properties and molecular weight distributions, as well as has an excellent catalyst activity can be prepared by adjusting the component ratio of each metallocene catalyst using the method for preparing the supported metallocene catalyst according to the present invention, and finally it means that the metallocene supported catalyst that can control the distribution of molecular weight and has an excellent activity can be prepared in a single reactor.

The invention claimed is:
1. A method for preparing a supported metallocene catalyst, comprising:
  i) preparing a support supported with metallocene compounds 1 and 2 by reacting metallocene compounds 1 and 2 with a support;
  ii) preparing a support supported with the metallocene compounds 1 and 2, and a co-catalyst 1 by reacting the support supported with the metallocene compounds 1 and 2 with the co-catalyst 1;
  iii) preparing a catalyst precursor that is sequentially supported with the metallocene compounds 1 and 2, the co-catalyst 1 and further metallocene compounds in the support by reacting the metallocene compounds 1 and 2 with the support supported with the metallocene compounds 1 and 2 and the co-catalyst 1; and
  iv) preparing a metallocene catalyst by reacting the catalyst precursor and a co-catalyst 2,
  wherein the supported amount of the co-catalyst 2 is 0.2 to 10 mole, based on 1 mole of the transition metal that is supported in the metallocene compound, by the boron contained in the co-catalyst 2, and
  wherein the metallocene compound 1 is [A-O—(CH$_2$)$_a$—C$_5$H$_4$]$_2$ZrCl$_2$, in which a is an integer of 4-8, and A is one selected from the group consisting of methoxymethyl, t-bytixymethyl, tetrahydropyranyl, tetrahydrofuranyl, 1-ethyoxyethyl, 1-methyl-1-methoxyethyl and t-butyl,
  wherein the metallocene compound 2 is [(A'-D-(CH$_2$)$_a$)](CH$_3$)X(C$_5$Me$_4$)(NCMe$_3$)TiCl$_2$, in which a is an integer of 4-8, X is methylene, ethylene or silicon, D is oxygen or nitrogen atom, and A' is one selected from the group consisting of alkyl, alkenyl, aryl, alkylaryl, arylalkyl, alkylsilyl, arylsilyl of carbon number 1-20, hydrogen, methoxymethyl, t-butoxymethyl, tetrahydropranyl, tetrahydrofuranyl, 1-ethoxyethyl, and 1-methyl-1-metoxyethyl and t-butyl,
  wherein the co-catalyst 2 is a borate compound represented by Formula 8;

T$^+$[BQ$_4$]$^-$      [Formula 8]

wherein T$^+$ is a polyatomic ion having a valency of +1; B is boron in an oxidation state of +3 form; and Q is independently selected from the group consisting of hydride, dialkylamido, alk oxide, aryloxide, hydrocarbyl, halocarbyl, and halo-substituted-hydrocarbyl radical, respectively, the above Q has below 20 carbons.

2. The method for preparing the supported metallocene catalyst according to claim 1, wherein the support is dried at 200 to 800° C.

3. The method for preparing the supported metallocene catalyst according to claim 1, wherein the support is one selected from the group consisting of silica, silica-alumina, and silica-magnesia.

4. The method for preparing the supported metallocene catalyst according to claim 1, wherein the co-catalyst 1 is the compound represented by Formula 7:

—[Al(R$^3$)—O]$_n$—      [Formula 7]

wherein,
  R$^3$ is the same or different halogen radical, hydrocarbyl radical of carbon number 1 to 20 or hydrocarbyl radical of carbon number 1 to 20 substituted with halogen to each other, and n is an integer of above 2.

5. The method for preparing the supported metallocene catalyst according to claim 4, wherein the compound represented by Formula 7 is one selected from the group consisting of methylaluminoxane (MAO), ethylaluminoxane, isobutylaluminoxane, and butylaluminoxane.

6. The method for preparing the supported metallocene catalyst according to claim 1, wherein the co-catalyst 2 is one or more selected from the group consisting of trimethylammonium tetraphenylborate, methyloctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, N,N-dimethyl-(2,4,6-trimethylanilinium)tetrakis-(2,3,4,6-tetrafluorophenyl)borate, dioctadecylammonium tetrakis(pentafluorophenyl)borate, ditetradecylammonium tetrakis(pentafluorophenyl)borate, dicyclohexylammonium tetrakis(pentafluorophenyl)borate, triphenylphosphonium tetrakis(pentafluorophenyl)borate, methyloctadecylphosphonium tetrakis(pentafluorophenyl)borate, tri(2,6-dimethylphenyl)phosphonium tetrakis(pentafluorophenyl)borate, methyldi(octadecyl)ammonium tetrakis(pentafluorophenyl)borate, and methyldi(tetradecyl)-ammonium tetrakis(pentafluorophenyl)borate.

7. A method for preparing a polyolefin, wherein an olefin-based monomer is polymerized under the presence of the supported metallocene catalyst prepared according to the method of claim 1.

8. The method for preparing the polyolefin according to claim 7, wherein the polymerization is performed in a slurry process or a gas-phase process.

9. The method for preparing the polyolefin according to claim 7, wherein the supported metallocene catalyst is injected to the olefin-based monomer, in which the supported metallocene catalyst is a type of slurry that is prepared by diluting in aliphatic hydrocarbon solvent of carbon number 5 to 12, aromatic hydrocarbon solvent, or hydrocarbon solvent substituted with Chlorine atom when it is injected.

* * * * *